March 6, 1962    R. M. EISENBERG    3,023,516
CONTROL FORCE SIMULATION
Filed Aug. 11, 1958

INVENTOR
ROBERT M. EISENBERG
BY
*H. Fredrick Hamann*
ATTORNEY

United States Patent Office 3,023,516
Patented Mar. 6, 1962

3,023,516
CONTROL FORCE SIMULATION
Robert M. Eisenberg, Rockville, Md., assignor to ACF Industries, Incorporated, New York, N.Y., a corporation of New Jersey
Filed Aug. 11, 1958, Ser. No. 754,430
8 Claims. (Cl. 35—12)

This invention relates to flight simulators and more particularly to circuitry for computing the force on a control member in flight training apparatus.

In training devices for teaching flight procedures and tactics it is often required that a force be provided at flight control members which is in opposition to the displacement of the control member from a neutral position. The most common control members simulated are the rudder pedals and control column. Displacement of the control column from neutral position in the fore and aft direction requires the computation of control member force due to motion of the elevator surfaces into the slipstream while displacement from neutral position in a line perpendicular to the center line of the craft requires a computation of control member force due to motion of the aileron surfaces into the aircraft slipstream. In some types of aircraft there is a direct follow system whereby there is but one control surface deflection position for each pilot control member deflection. That is, there is a fixed curve between the pilot's control member deflection and the control surface deflection. In aircraft having a floating type of control the relationship between the pilot's control deflection and the control surface deflection is not a fixed curve but varies in accordance with aircraft velocity and altitude. One such system is that employing a spring tab and torque tube arrangement. In such an arrangement after a control surface has reached its mechanical limit, further movement of the control member applies presure or "winds up" a torque tube with an accompanying force on the control member tending to return it to the centner or neutral position.

This invention describes circuitry used to simulate the floating type relationship between control deflection and control surface deflection in that it simulates the incremental pilot's control force for conditions when the control column has not reached its stops but due to aerodynamic surface loading the elevator is already in contact with its stops or mechanical limits.

The physical effects of control force simulation are to provide a force in opposition to displacement of control members from the neutral position. This may be accomplished either by direct mechanical means such as springs, by hydraulic force, pneumatic bellows or electromechanical devices. One electromechanical device which is ideally suited for force control is the magnetic clutch. If such an electromechanical device is utilized the major problem becomes the development or computation of an electrical quantity analagous to the force to be simulated. The normal force to be exerted on a control member is computed separately and considers various flight conditions. The normal force on the elevator, for example, is computed throughout the normal range of movement of the control column in the fore and aft direction and the resulting voltage is applied to the torque or force device to provide the force felt by the pilot in operation of the control column during the majority of the flight. This invention is directed to the computation of the force near the extremities of the movement of the control column deflection and more particularly at that point where the control column has not reached its mechanical stops but due to other conditions such as aerodynamic surface loading, the elevator transmits a force in opposition to the control column so as to exert a force on the torque tube arrangement.

The circuit of this invention is ideally suited for applications involving variable quantities wherein a choice or selection of magnitudes must constantly be made and the output itself limited to some specific value. The circuit is easily adapted to handle non-symmetrical situations such as exist where, from a variable phase input, an output is desired, at one input magnitude when the input is of one phase and at a second input magnitude when the input is of opposite phase. For example, in the preferred embodiment an arrangement is described wherein it is assumed the elevator will reach its mechanical limit in one direction after a shorter travel than in the opposite direction. The output of the circuitry is therefore that of a function generator whose output will be zero for medium range control deflections and having the characteristic of a rapidly increasing output for those control deflections which exceed those set by the elevator surface stops. This output may then be added to other control force computation analog voltages to provide a single voltage which in turn will control the force applied to a control member tending to return the control member to its neutral position.

It is therefore a broad object of this invention to provide circuitry combining the charcteristics of magnitude selection and limiting.

It is a further object of this invention to provide non-symmetrical magnitude selection in accordance with unbalanced reference voltages and to limit the output of the magnitude selector.

It is a further object to provide magnitude selection circuitry for use with A.C. signals.

It is another object of this invention to provide a limiter circuit for use with A.C. signals.

It is another object of this invention to provide control force simulation circuitry including diode function generating arrangements.

It is a still further object of this invention to provide circuitry to simulate the elevator spring and balance tab blowback rod effects on control force in the simulation of aircraft having a floating type control where the relationship between the pilot's control member deflection and the control surface deflection is not a fixed curve.

It is a still further object of this invention to provide circuitry for computing a voltage analog of the force appearing on the control column of a simulated flight trainer for those conditions when the control column has not reached its stops but due to aerodynamic surface loading the simulated surface to be controlled resists any further motion.

The novel features of the invention are set forth in the appended claims and the invention as to its organization and its mode of operation will best be understood from a consideration of the following detailed description of the perferred embodiment when used in connection with the accompanying drawings which are hereby made a part of the specification and in which:

The preferred embodiment of this invention provides a diode circuit arrangement for magnitude selection and limiting as used with potentiometers driven by electro-mechanical shafts represented Mach, corrected velocity, altitude and control column deflection in the simulated aircraft so as to provide a control force analog voltage.

In the following detailed description of the apparatus by which the objects of the invention are realized the various aeronautical and control system parameters are abbreviated in the following manner:

$Ma$ = Mach, an indication of aircraft velocity.
$hp$ = Altitude of simulated aircraft.
$dc$ = Deflection of control column.
$Vc$ = Corrected computed simulated aircraft velocity.

The expression describing the output voltage appearing on conductor 86 is:

$$K4(1-Kb)f6(dc)f10(Vc)$$

$K4$ is a constant.
$Kb$ is a Boolian function equal to 1 when $$K7 \leq K8 \frac{f2(Ma)f5(dc)}{f3(hp)} \leq K9$$

Figure 1:
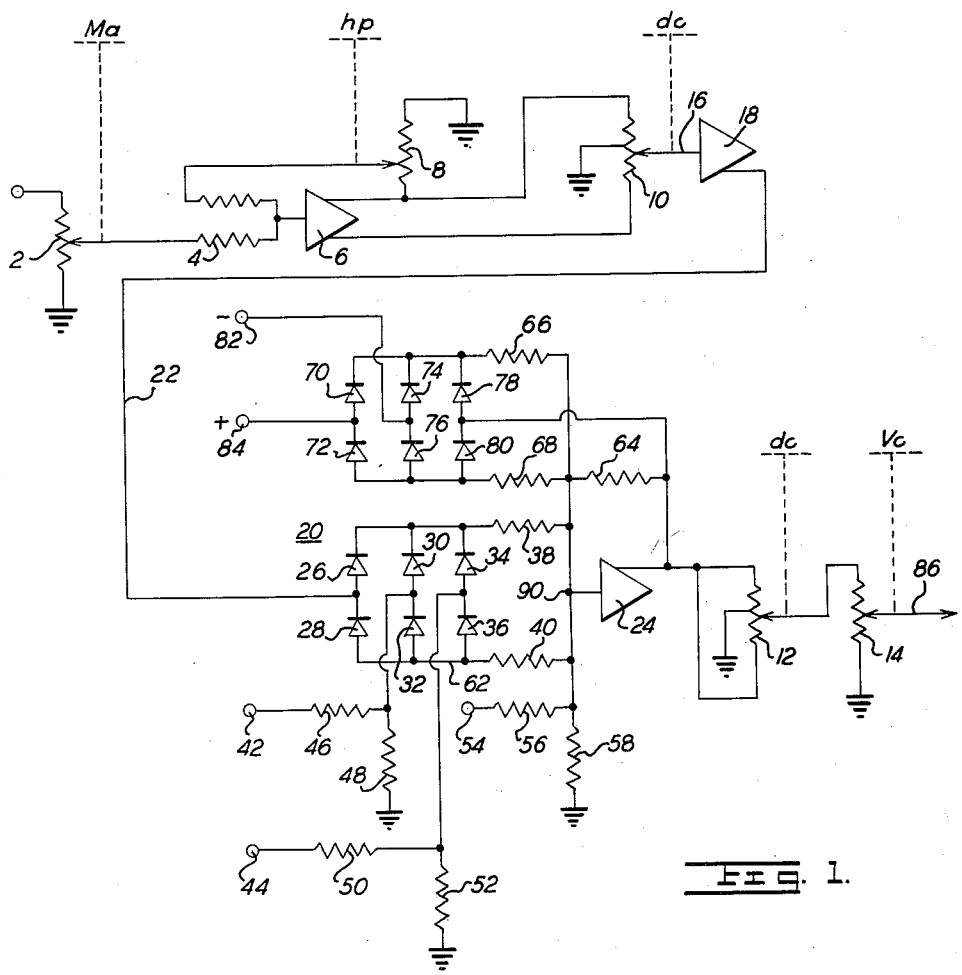
FIG. 1 is a schematic representation of the control force simulation circuitry.

$K7$ is elevator deflection limit in negative direction.
$K9$ is elevator deflection limit in the positive direction.

$$K8 \frac{f2(Ma)f5(dc)}{f3(hp)}$$

is elevator deflection in items of control deflection, Mach number and altitude since this is not a fixed relationship. The operation of the circuitry is as follows:

FIG. 1 shows the preferred embodiment of the invention and the mechanization of the first equation.

A voltage proportional to $f2(Ma)$ as derived from the resistance type function generator 2 is fed to input impedance 4 to the summing amplifier divider network made up of function 3(hp) potentiometer 8 and summing amplifier 6. The voltage output of amplifier 6 is then multiplied by $f5(dc)$, the voltage on the wiper of potentiometer 10 being proportional to the expression $$\frac{K8f2(Ma)f5(dc)}{f3(hp)}$$

$K8$ is a constant. The arms of the three potentiometers 2, 8 and 10 as well as the arm of potentiometers 12 and 14 are all driven by electromechanical shafts whose position is determined by voltage analogs or other means so as to position the shaft and its associated potentiometer arm proportional to the values of Mach, altitude, control deflection and corrected velocity. The value of the $K8$ term appears on conductor 16 and is fed to an amplifier 18 which isolates potentiometer 10 from the diode circuitry which follows. A diode magnitude selector 20 is used in conjunction with the summing amplifier 24 to determine the value of $K8$ times $$\frac{f2(Ma)f5(dc)}{f3(hp)}$$

at which a steep voltage gradient is generated. When the $K8$ term is equal to zero the diodes 26 and 28 are biased to cut off by the negative phase voltage from terminal 42 which is applied to the divider made up of impedances 46 and 48 and then fed to diodes 30 and 32. Diodes 34 and 36 bias diodes 26 and 28 to cutoff by the positive phase voltage established by the divider network of impedances 50 and 52 which is energized by a positive phase voltage at terminal 44. The negative potential which is connected to the diode pair 30—32 is designated as $K9$ and is of a magnitude to indicate the maximum amount of control surface deflection in one direction and is of a phase arbitrally chosen as being 180° out of phase with a reference voltage. Any voltages designated as a positive AC voltage merely indicates that it is of the same phase as an arbitrally chosen reference phase. The positive phase voltage connected to terminal 44 is divided by impedances 50 and 52 so as to present a voltage at the junction of diodes 34 and 36 designated as $K7$, whose magnitude is proportional to the control surface deflection limit. Since the point at which the elevator hits its stops in the positive direction is not necessarily the same as in the negative direction a residual voltage proportional to the difference of the two constants $K9$ and $K7$ is cancelled by means of subtracting a voltage of the phase opposite to the larger of the two voltages on terminals 42 and 44 and of a magnitude equal to the difference between the two voltages. This correcting voltage is applied at terminal 54 which is connected to input impedance 56, the effect being that the references applied at the three terminals 42, 44 and 54 will cancel each other out with a resultant zero signal at the grid of amplifier 24.

The steepness of the output slope of amplifier 24 will be governed by the gain through amplifier 24. Thus, the output gradient is determined by feedback resistors 64, 66 and 68.

The purpose of the diodes 70, 72, 74, 76, 78 and 80 and resistors 66 and 68 is to limit the maximum output voltage that can be obtained or established by plus or minus $E_{max}$ which appear at the two terminals 82 and 84. Impedance 64 is the slope determining resistor within the normal operating range. It can be seen that any positive voltage representing the expression $$K8 \frac{f2(Ma)f5(dc)}{f3(hp)}$$

will be multiplied by the gain of amplifier 24 when its magnitude becomes greater than the voltage on terminal 44 representing $K7$ or if negative when its magnitude is greater than the voltage on terminal 42 which represents $K9$.

Figure 2:
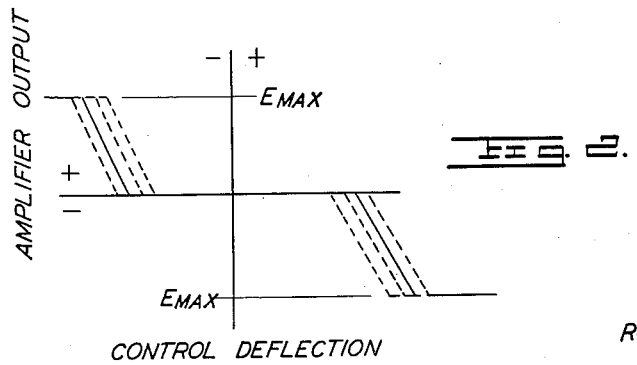
FIG. 2 shows the relationship between the control deflection and the output of the control force simulation circuit.

The output of the amplifier 24 versus elevator deflection is shown in FIG. 2. The broken lines indicate how the output voltage gradient appears at different control deflections as a function of velocity and altitude. This output of amplifier 24 is then multiplied by $f6(dc)$ and $f10(Vc)$ and then added with the normal force equation not shown into the force producing device which is also not shown. The final output of this invention appears on conductor 86 and is in the form of a voltage analagous to the control force which would be exerted against a control member in an aircraft when the control member or column had not yet reached its mechanical limits but at a time when the aerodynamic surface extending into the slipstream had reached its stops. This voltage when summed with the normal intermediate control force analog would represent the total control loading on a given control member.

It should be understood that this invention is not limited to specific details of construction and arrangement thereof herein illustrated and that changes and modifications may occur to one skilled in the art without departing from the spirit of the invention; the scope of the invention being set forth in the following claims.

What is claimed is:

1. A function generating circuit comprising means for generating a first analog potential proportional to simulated aircraft elevator deflection, a magnitude selector responsive to said first analog potential and second and third analog potentials representative of the limits of travel of the elevator by which an output is produced dependent on the relative phases and amplitudes of the three said analog potentials, amplifier means, limiting feedback means responsive to the magnitude selector, the amplifier output and limiting potentials such that the amplifier output does not exceed the limiting potentials, and multiplying means responsive to simulated flight characteristic variables and the amplifier output whereby a function voltage is generated in accordance with the values of elevator deflection and simulated flight characteristic variables.

2. In a grounded flight trainer having flight control members to be operated by a student pilot and having apparatus for indicating the values of simulated Mach, corrected velocity, altitude and control column deflection from a neutral position, a function generating circuit comprising means for generating a first analog potential proportional to aircraft elevator deflection in terms of control member deflection, Mach number, and altitude, a magnitude selector responsive to sair first analog potential and second and third analog potentials representative of the limits of travel of the elevator by which an output is produced dependent on the relative phases and amplitudes of the three said analog potentials, amplifier means, limiting feedback means responsive to the amplifier output and maximum limiting potentials such that the maximum amplifier output is limited to the magnitude of the maximum limiting voltages, and multiplying means responsive to control column deflection, corrected velocity and amplifier output such that a voltage analog is produced which is representative of the force acting upon the simulated control member tending to return it to its neutral position.

3. In a grounded flight trainer having flight control members to be operated by a student pilot and having apparatus for indicating the values of simulated Mach, corrected velocity, altitude and control column deflection from a neutral position, a function generating circuit comprising means for generating a first analog potential proportional to aircraft elevator deflection in terms of control member deflection, Mach number, and altitude, a magnitude selector responsive to said first analog potential and second and third analog potentials representative of the limits of travel of the elevator by which an output is produced dependent on the relative phases and amplitudes of the three said analog potentials, a difference potential of a magnitude equal to the difference between the said second and third analog potentials and of the same phase as the smaller of the two, amplifier means having an input responsive to the said difference potential and said magnitude selector output and having an output proportional to the inputs, limiting feedback means responsive to the amplifier output and maximum limiting potentials such that the maximum amplifier output is limited to the magnitude of the maximum limiting voltages, and multiplying means responsive to control column deflection, corrected velocity and amplifier output such that a voltage analog is produced which is representative of the force acting upon the simulated control member tending to return it to its neutral position.

4. A magnitude selector circuit for selecting the largest of a first A.C. potential of fixed magnitude, a second A.C. potential of fixed magnitude and of a phase opposite to said first potential, a third A.C. potential of variable magnitude and having a phase identical with either the first or second potential comprising a parallel arrangement of at least three diode pairs in which each diode pair is connected in series relation, conductors interconnecting the three cathode terminals of the series diode pairs to a first common terminal, conductors interconnecting the three anode terminals of the series diode pairs to a second common terminal, junction connections at each point of interconnection of the diodes of each diode pair, and interconnecting conductors between the three said A.C. potentials and the three junction connections whereby summation of the resulting potentials appearing at the said first and second common terminals results in a potential proportional to the largest of the three A.C. potentials.

5. A limiting circuit, responsive to a variable A.C. potential input, comprising an amplifier, an amplifier feedback path having a parallel arrangement of a plurality of diode pairs in which the diodes of each pair are connected in series relation, conductors interconnecting the cathode terminals of the diode pairs to a first common terminal, conductors interconnecting the anode terminals of the diode pairs to a second common terminal, a first and second maximum A.C. potential each 180° out of phase with the other, junction connections at each point of interconnection of the diodes of each diode pair, and conductors interconnecting one of the said junction connections with the output of the said amplifier, and each of two remaining junction connections to one of the two said maximum potentials, and conductors interconnecting the said first and second common terminals with the input to the amplifier whereby the output of the amplifier is limited to the value of the first or second maximum A.C. potential in dependence on the phase of the variable A.C. voltage input.

6. A limiting circuit comprising an amplifier, a variable A.C. voltage input to said amplifier, a first feedback path from the amplifier output through a first impedance to the amplifier input, a second feedback path having a parallel arrangement of at least threee diode pairs in which each diode pair is connected in series relation, conductors interconnecting the three cathode terminals of the series diode pairs to a first common terminal, conductors interconnecting the three anode terminals of the series diode pairs to a second common terminal, a first and second maximum A.C. potential each 180° out of phase with the other, junction connections at each point of interconnection of the diodes of each diode pair, and conductors interconnecting one of the said junction connections with the output of the said amplifier, and each of two remaining junction connections to one of the two said maximum potentials, and conductors interconnecting the said first and second common terminals with the input to the amplifier whereby the output of the amplifier is limited to the value of the first or second maximum A.C. potential in dependence on the phase of the variable A.C. voltage input.

7. In a flight trainer, circuitry responsive to an analog potential proportional to a simulated aircraft control surface deflection for generating an analog of the control force acting upon a flight control member comprising a first analog potential and a second analog potential whose magnitudes are proportional to the simulated control surface deflection limits, a magnitude selector circuit responsive to the phase and magnitude of the control surface deflection analog and said first and second control surface deflection analogs, said magnitude selector circuit including a plurality of diode pairs in which the diodes of each pair are connected in series relation, conductors interconnecting the cathode terminals of the series diode pairs to a first common terminal, conductors interconnecting the anode terminals of the series diode pairs to a second common terminal, junction connections at each point of interconnection of the diode of each diode pair, a plurality of A.C. potential sources, and interconnectors arranged such that each A.C. potential source is connected to one of said junction connections, one potential to a junction connection.

8. In a flight trainer, circuitry for generating an analog of control force to be used to develop force on a control member comprising, a first analog potential proportional to the simulated aircraft elevator deflection, a second potential and a third potential whose magnitudes are proportional to the simulated elevator deflection limits, a magnitude selector responsive to the phase and magnitude of the said first, second and third potentials such that an output potential exists only if the said first potential exceeds in magnitude either the second or third potential whereby the output potential represents the control force resulting from movement of the control member in a direction to tend to move the simulated elevator beyond its deflection limits; said magnitude selector including a plurality of diode pairs in which the diodes of each pair are connected in series relation, conductors interconnecting the cathode terminals of the series diode pairs to a first common terminal, conductors interconnecting the anode terminals of the series diode pairs to a second common terminal, junction connections at each point of interconnection of the diodes of each diode pair; and an A.C. potential source and an interconnecting connector coupled to each of said conjunction connections.

References Cited in the file of this patent

UNITED STATES PATENTS

| | | |
|---|---|---|
| 2,804,698 | Grandmont | Sept. 3, 1957 |
| 2,808,659 | Dehmel | Oct. 8, 1957 |

OTHER REFERENCES

Electronic Analog Computer (Text), Korn and Korn, 2nd ed., McGraw-Hill Co., page 83, FIG. 3.3f.